(12) United States Patent
Bradburn

(10) Patent No.: US 6,825,953 B1
(45) Date of Patent: Nov. 30, 2004

(54) HALFTONE EMPLOYING 1 TO 1 SCREENING

(75) Inventor: Brent M. Bradburn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/514,963

(22) Filed: Feb. 29, 2000

Related U.S. Application Data

(63) Continuation-in-part of application No. 09/399,613, filed on Sep. 20, 1999.

(51) Int. Cl.$^7$ .................................................. G06K 9/36
(52) U.S. Cl. ........................ 358/3.07; 358/3.06; 358/3.2
(58) Field of Search ........................ 358/1.9, 3.06–3.12, 358/3.21–3.22, 534–536, 461, 3.2; 382/237

(56) References Cited

U.S. PATENT DOCUMENTS

| | | | | |
|---|---|---|---|---|
| 5,526,445 A | * | 6/1996 | Smutek et al. ............... | 382/237 |
| 5,647,026 A | | 7/1997 | Kwarta ........................ | 382/270 |
| 5,822,451 A | * | 10/1998 | Spaulding et al. ........... | 382/162 |
| 5,966,507 A | * | 10/1999 | Lin ............................. | 358/1.9 |

FOREIGN PATENT DOCUMENTS

| | | |
|---|---|---|
| EP | 0785528 | 7/1997 |
| GB | 2097883 A | 8/1982 |
| GB | 2196508 A | 4/1983 |
| GB | 2141805 A | 1/1985 |
| JP | 08118440 A | 7/1990 |
| JP | 11005700 | 12/1999 |

* cited by examiner

*Primary Examiner*—Thomas D. Lee
*Assistant Examiner*—Stephen Brinich

(57) ABSTRACT

The invention provides a procedure that is applicable to various halftoning methods, which minimizes image distortion introduced by the halftoning process. The procedure involves maintaining specific relationships between the halftone pattern and the phase and resolution of the input image. Specifically, that the halftone pattern is designed such that it does not bias tone reproduction with respect to the location of the input image pixels—each input pixel should be given equal weight when filtered by the halftoning process. This suggests a 1 to 1 relationship between each pixel of the input image and the corresponding tone output produced by the halftoning process. The procedure results in improved print quality, manifested by avoidance of certain types of moiré which are commonly associated with halftoning, as well as improved reproduction of edges and image details.

8 Claims, 16 Drawing Sheets

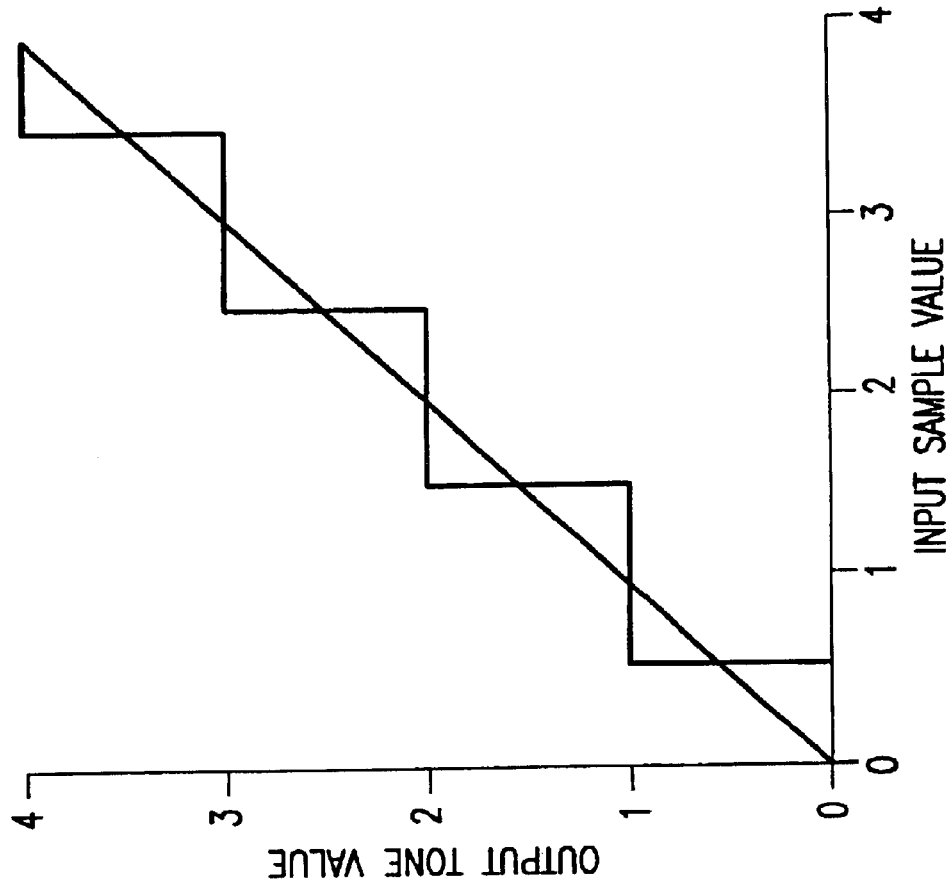

| INPUT | OUTPUT |
|---|---|
| 0.0-0.5 | 0 |
| 0.5-1.5 | 1 |
| 1.5-2.5 | 2 |
| 2.5-3.5 | 3 |
| 3.5-4.5 | 4 |
| 4.5-5.5 | 4 |
| 5.5-6.5 | 4 |
| 6.5-7.5 | 4 |
| 7.5-8.0 | 4 |

| INPUT | OUTPUT |
|---|---|
| 0.0-0.5 | 0 |
| 0.5-1.5 | 0 |
| 1.5-2.5 | 0 |
| 2.5-3.5 | 0 |
| 3.5-4.5 | 0 |
| 4.5-5.5 | 1 |
| 5.5-6.5 | 2 |
| 6.5-7.5 | 3 |
| 7.5-8.0 | 4 |

DIRECT 1 TO 1 PATTERN

DISPERSED 1 TO 1 PATTERN

| 25 | 19 | 13 | 7  | 8  | 14 | 20 | 26 |
|----|----|----|----|----|----|----|----|
| 31 | 27 | 5  | 1  | 2  | 6  | 28 | 32 |
| 29 | 23 | 9  | 3  | 4  | 10 | 24 | 30 |
| 21 | 17 | 15 | 11 | 12 | 16 | 18 | 22 |
| 8  | 14 | 20 | 26 | 25 | 19 | 13 | 7  |
| 2  | 6  | 28 | 32 | 31 | 27 | 5  | 1  |
| 4  | 10 | 24 | 30 | 29 | 23 | 9  | 3  |
| 12 | 16 | 18 | 22 | 21 | 17 | 15 | 11 |

SYSTEMATIC PATTERN GENERATION

— SPOT VALUES

A →

| 3.8 | 2.9 | 2.1 | 1.6 | 1.6 | 2.1 | 2.9 | 3.8 |
|---|---|---|---|---|---|---|---|
| 3.5 | 2.5 | 1.6 | 0.7 | 0.7 | 1.6 | 2.5 | 3.5 |
| 3.5 | 2.5 | 1.6 | 0.7 | 0.7 | 1.6 | 2.5 | 3.5 |
| 3.8 | 2.9 | 2.1 | 1.6 | 1.6 | 2.1 | 2.9 | 3.8 |

← B

SPOT ( x , y ) = sqrt ( x * x + y * y )

FIG.7a

— ORDERED VALUES

A →

| 29 | 21 | 13 | 5  | 6  | 14 | 22 | 30 |
|---|---|---|---|---|---|---|---|
| 25 | 17 | 7  | 1  | 2  | 8  | 18 | 26 |
| 27 | 19 | 9  | 3  | 4  | 10 | 20 | 28 |
| 31 | 23 | 15 | 11 | 12 | 16 | 24 | 32 |

—ADD BOTTOM HALF

| 29 | 21 | 13 | 5  | 6  | 14 | 22 | 30 |
|----|----|----|----|----|----|----|----|
| 25 | 17 | 7  | 1  | 2  | 8  | 18 | 26 |
| 27 | 19 | 9  | 3  | 4  | 10 | 20 | 28 |
| 31 | 23 | 15 | 11 | 12 | 16 | 24 | 32 |
| 6  | 14 | 22 | 30 | 29 | 21 | 13 | 5  |
| 2  | 8  | 18 | 26 | 25 | 17 | 7  | 1  |
| 4  | 10 | 20 | 28 | 27 | 19 | 9  | 3  |
| 12 | 16 | 24 | 32 | 31 | 23 | 15 | 11 |

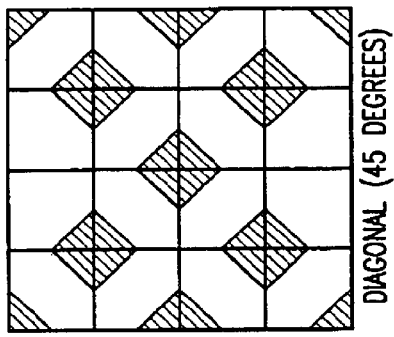
FIG.8c DIAGONAL (45 DEGREES) FOUR-WAY
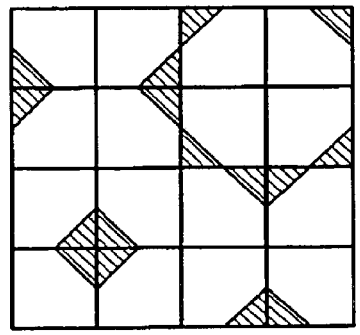
FIG.8f CIRCLES
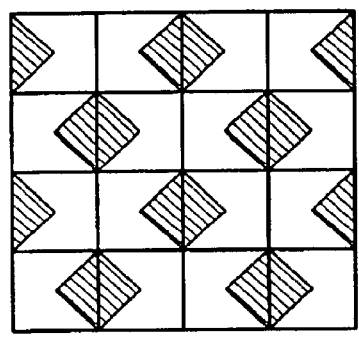
FIG.8b DIAGONAL (45 DEGREES) TWO-WAY VERTICAL
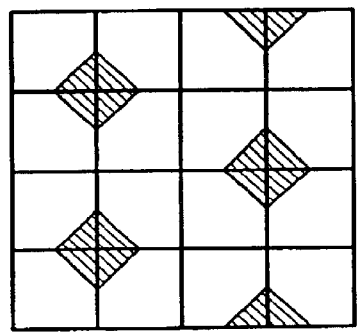
FIG.8e HEXAGONAL-HORIZONTAL
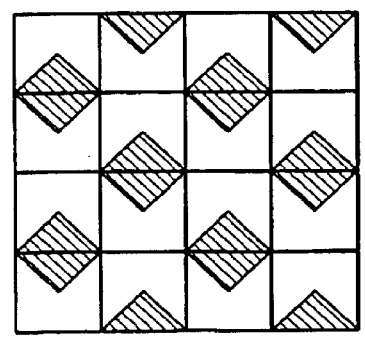
FIG.8a DIAGONAL (45 DEGREES) TWO-WAY HORIZONTAL
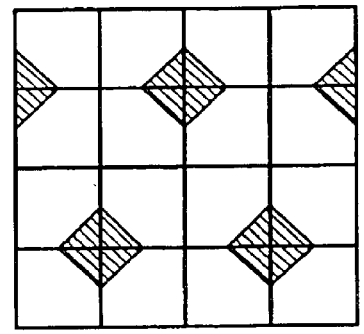
FIG.8d HEXAGONAL-VERTICAL

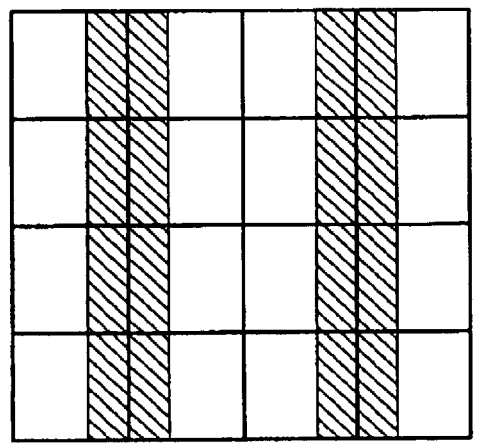
FIG.8i HORIZONTAL LINE
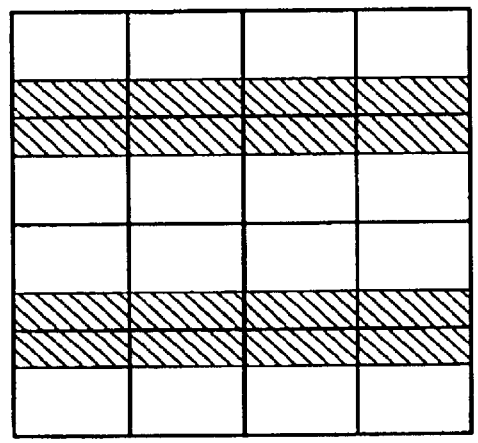
FIG.8h VERTICAL LINE
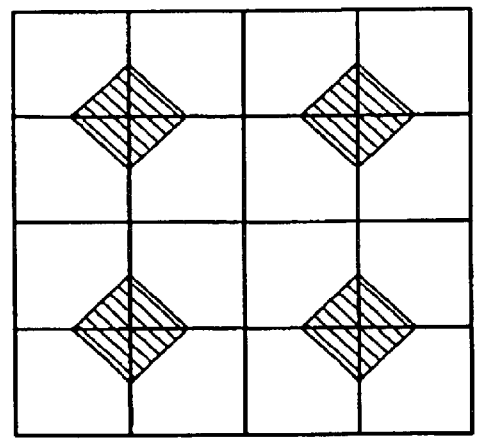
FIG.8g SQUARE (NOT ROTATED)

HALFTONE EMPLOYING 1 TO 1 SCREENING

CROSS REFERENCE TO RELATED APPLICATONS

This application is a continuation in part of co-pending U.S. Application Ser. No. 09/399,613 filed Sep. 20, 1999.

FIELD OF THE INVENTION

This invention relates to a halftone method and more particularly to a halftone method which minimizes image distortion introduced by the halftoning process.

BACKGROUND OF THE INVENTION

Many types of printing devices use a limited variety of ink (or toner) colors for the production of printed pages (typically one color for monochrome devices and four colors for color devices). These devices are generally bistable with respect to the output of individual ink levels. In particular, output of the ink is either enabled or disabled at any given location on a page. In such devices, intermediate tones are created using a process called halftoning, in which ink output is modulated against a background defined by the color of the print media (e.g. paper) so as to create an average tone which will be visually integrated by the viewer.

Owing to historical methods for achieving the effect of halftoning, the halftone process is synonymously referred to as halftone screening or simply screening.

The process of halftoning is widely recognized, by those skilled in the art, as a potential source of image content distortion. This distortion is typically manifested as 1) a loss of sharpness, 2) introduction of moiré, and 3) exaggeration of image noise. These effects are largely due to a phenomenon known as aliasing, which in this context, is defined as the misrepresentation of image content due to inadequate sampling. This occurs because arbitrarily applied halftoning can effectively introduce its own sampling grid—which may be insufficient to yield a proper representation of the image's contents.

The phenomenon of aliasing, as it relates to the process of sampling, is known and well documented in the public literature (esp. as sampling theory). For purposes of understanding the invention to be described below, inadequate sampling can be conceptualized as sparse sampling. More particularly, there is information in the original image which does not contribute to the resulting image because it "slips through the cracks" in the (sparse) sampling grid. The standard solution to this problem is to match the sampling resolution with a (pre-sample) blurring process which "spreads out" the representation of image details to ensure that no detail remains spatially isolated (in the "cracks") such that it can avoid being sampled.

As previously discussed, the standard way to avoid aliasing is to prefilter the data being sampled with a blurring filter. This blurring process is sometimes called smoothing and may be referred to technically as low-pass filtering (this name derives from the nature of the filter—that low frequency content is passed through unaltered while high frequency content is attenuated). Blurring an image has the disadvantage that edge and detail content become less discernible, which generally reduces the effectiveness or visual appeal of the image.

The use of a sharpening filter (sometimes called unsharp masking) can improve the visibility of edge and detail image content. Such a filter operates by increasing the localized contrast where edges and details are present, thereby increasing the localization and amplitude of such content. Application of a sharpening filter can be used to counteract the loss of sharpness which may be associated with halftoning. Unfortunately, sharpening an image has the disadvantage that it increases the visibility of image noise and strengthens the potential moiré interference between high frequency image content and the halftone pattern.

Sharpening and blurring are opposite types of filters and are effectively mutually exclusive of one another. To be effective on documents with varied content, one or both types of filtering may need to be applied dynamically—based on the results of a content analysis algorithm. The problem with this type of processing is that it tends to be complex and prone to error.

Another way to avoid halftone induced aliasing is to use very high frequency or dispersed-dot halftoning. Both of these types of halftoning utilize very small halftone dots—often placing them very close together as well. These methods can avoid introducing aliasing if their effective sampling grid is well aligned with that of the image being halftoned. This may, in fact, be the preferred solution for some types of devices—most notably printers based on ink-jet technology (which may actually require dispersed-dot halftoning due to problems with alignment and over-saturation of ink). However, due largely to output instabilities resulting from cost/performance tradeoffs, many printing devices still work best with lower frequency clustered halftones.

Accordingly, it is an object of the invention to provide an improved halftone process.

It is a further object of the invention to provide an improved halftone process that avoids creation of image artifacts.

SUMMARY OF THE INVENTION

The invention provides a computer-implemented procedure that is applicable to various halftoning methods, which minimizes image distortion introduced by the halftoning process. The procedure involves maintaining specific relationships between the halftone pattern and the phase and resolution of the input image. Specifically, that the halftone pattern is designed such that it does not bias tone reproduction with respect to the location of the input image pixels—each input pixel should be given equal weight when filtered by the halftoning process. This suggests a 1 to 1 relationship between each pixel of the input image and the corresponding tone output produced by the halftoning process. The procedure results in improved print quality, manifested by avoidance of certain types of moiré which are commonly associated with halftoning, as well as improved reproduction of edges and image details.

A preferred embodiment of the invention creates a scaled halftoned destination pixel image from a source pixel image portion that comprises plural source pixels. (1) Initially, a scaled set of matrix values is created to be used for each of the source pixels. (2) Then, depending upon a determined halftone relationship of a source pixel and each of said scaled set of matrix values, a scaled set of destination pixels is created. Each respective created destination pixel value is dependent upon a relationship of a value of the respective source pixel and a corresponding matrix value. Thereafter, step 2 is repeated for each source pixel, using the scaled set of matrix values, and arranging the scaled set of matrix values to create a determined halftone pattern over the source pixels that exhibits a desired repeating pattern. Each scaled set of destination pixels produced thus exhibits a reduced tonal error as a result of use of the same scaled set of matrix values for each source pixel.

BRIEF DESCRIPTION OF THE DRAWING

FIG. 1a illustrates a 4×4 dither matrix with 16 threshold indices.

FIG. 1b illustrates a 2×2 source pixel matrix overlaid with the 4×4 threshold matrix of FIG. 1a.

FIG. 2a shows a simple 2×2 dither pattern which filters the area of a single source pixel with threshold indices from 1 to 4.

FIG. 2b is a function table which shows the numerical mapping between input source pixel values and corresponding output tone values as filtered by the dither pattern.

FIG. 2c is a graph of the tone reproduction function that results from FIG. 2b.

FIG. 3a illustrates a prior art threshold matrix (i.e., dither pattern) that is referred to as a diagonal (45 degree) halftone screen.

FIG. 3b graphically represents development priorities indicated numerically in FIG. 3a.

FIG. 3c is a graph that illustrates error values associated with halftoning using the dither pattern of FIG. 3a.

FIG. 4a illustrates a dither pattern in which each source pixel is represented directly by an entire halftone cell.

FIG. 4b graphically represents development priorities indicated numerically in FIG. 4a.

FIG. 4c is a graph that illustrates error values associated with halftoning using the dither pattern of FIG. 4a.

FIG. 5a illustrates a reduced frequency dither pattern.

FIG. 5b graphically represents development priorities indicated numerically in FIG. 5a.

FIG. 5c is a graph that illustrates error values associated with halftoning using the dither pattern of FIG. 5a.

FIG. 6a illustrates application of a simple dispersion to the dither pattern shown in FIG. 5a. The pattern is modified by doubling the total number of threshold indices and alternating the advancement of index values between the source pixels so that source pixels A and D contain the odd values and source pixels B and C contain the even values.

FIG. 6b graphically represents development priorities indicated numerically in FIG. 6a.

FIG. 6c is a graph that illustrates error values associated with halftoning using the dither pattern of FIG. 6a.

FIGS. 7a–7c illustrate an example of derivation of a dither pattern using a spot function.

FIGS. 8a–8i illustrate a plurality of 1 to 1 screen geometry's.

DETAILED DESCRIPTION OF THE INVENTION

Dither Patterns and Tiled Threshold Arrays

Figures 1A, 1B:
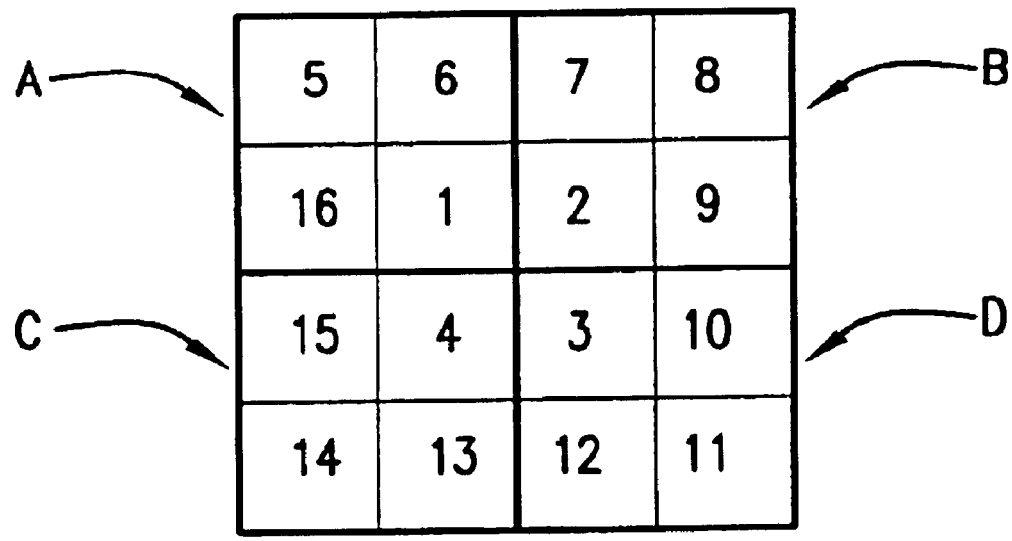

A preferred embodiment of this invention is based on a known halftoning algorithm which applies a two-dimensional array of values, called a threshold matrix, in a tiled fashion across the area of the image being halftoned. For each location in a destination image, a pixel value is output—its value being determined based on a comparison of the source image pixel at that location to corresponding threshold value. The invention is related to the nature of the data stored in the threshold matrix and the relationship of that data to the fundamental sampling grid of the source image.

For purposes of the description below, a dither pattern is an array of data values that enable threshold matrix values to be derived. The dither patterns used below contain a set of values, called threshold indices, which are sequential, starting at the value of 1 (although values may be duplicated). The indices represent a pixel priority which corresponds to the structure of the halftone pattern.

A threshold matrix can be derived from its corresponding dither pattern by adjusting the threshold indices in the dither pattern to match the range of values which may be represented by source image pixels. This conversion may also take into account other factors. For example it may apply a tone compensation which corrects for possible non-linearities of the output device.

A halftone cell is the smallest region of pixels that completely represents the primary repeating pattern of the halftone. This is typically the cluster of pixels seen as an individual halftone dot. To define the halftone over a larger area, the halftone cell is repeated in a tiled fashion to cover the area in question. For purposes of this description, a halftone cell is distinguished from a halftone "supercell". A supercell is a composition of multiple halftone cells and typically introduces small variations to the shape or tone reproduction of each cell in order to achieve a more precise screen angle and/or to introduce a slight tone dispersion which may reduce the appearance of tonal contouring (described later). For further information regarding threshold matrices and dither patterns, reference is made to chapter 2 of the book "PostScript Screening" by Peter Fink, (c) 1992 (incorporated herein by reference).

This invention is described in terms of a digital halftoning algorithm which uses a tiled threshold matrix to select the values of binary pixels for the output device. However, it will be appreciated by those skilled in the art that the invention is applicable to a broader variety of mechanisms including other digital halftoning algorithms such as those which utilize multiple output levels per pixel, also including analog halftoning methods such as might be used in a long-run printing press.

Scaled Halftoning

An assumption will be made hereafter that the resolution of the destination pixel halftone output is higher than the original resolution of the source image being halftoned. For example, a source image might be captured at a resolution of 300 dpi, and then printed, via halftoning, at 1200 dpi. This differential implies an element of resolution conversion (also called image scaling).

It is an important element of this invention that halftone patterns be defined with respect to a specific source image sampling grid that is defined by the resolution of the destination image. As such, the term source pixel will be used, in this document, to indicate the value of a received image pixel at a pre-scaling resolution.

The Figures employ a simple schema to indicate the relationship between a dither pattern and the source pixel grid that it will be applied to. FIGS. 1a and 1b demonstrate this schema. In FIG. 1a, there are 16 threshold indices separated by lines that indicate the boundaries of the source pixel regions. Each source pixel is paired with a single threshold index, which indicates that this dither pattern is designed to be applied to an unscaled input image. The dither pattern in FIG. 1b contains an identical set of threshold indices. However, in this pattern, each source pixel (labeled A,B,C and D) is overlaid by four threshold indices, indicating a scale factor of 2×2, and further indicating the specific positional relationship between the dither pattern and the destination pixel grid.

The following software source code, written in C, demonstrates a method of performing scaling and halftoning as a single process. It will, however, be apparent to those skilled in the art, that scaling and halftoning are separable operations and may therefore be applied as individual steps of a pipelined sequence.

```
// scale and halftone an image
    for ( y=0; y<height*y_scale; y++ )
        for ( x=0; x<width*x_scale; x++ )
        {
            int threshold = threshold_array [y%y_tile]
            [x%x_tile]; // load the threshold value
            int source pixel = image[y/y_scale]
            [x/x_scale]; // load the image source pixel
            output[y][x] = ( source pixel < threshold ) ?
            white : black; // perform threshold operation
        }
```

Available Output Tone Levels

A significant characteristic of digital halftoning methods is that they are capable of producing a specific maximum number of distinct tone levels over a given area. In many cases, this number can be easily calculated using the following formula:

Destination pixels*(sublevels−1)+1

In this formula, "destination pixels" indicates the number of output pixels representing a given area and sublevels indicates the number of different tone values to which each destination pixel can be assigned (this value is two for binary output but can be more, depending on the attributes of the device).

Tone Reproduction Functions

Subsequent discussion of halftoning will include analysis of the relationship between source pixel values and their tone reproduction via a dither pattern. These relationships can be represented as mathematical functions which will be referred to as tone reproduction functions. FIG. 2a shows a simple dither pattern which filters the area of a single source pixel, with threshold indices from 1 to 4. FIG. 2b is a function table which shows the numerical mapping between source input pixel values and the corresponding output destination tone values as filtered by the dither pattern.

In order to simplify the function descriptions, the input range is mapped, as real numbers, to the total number of threshold indices for the dither matrix—in this case 0.0 through 4.0 (practical applications typically map the dither pattern to an input range of integers from 0 through 255). Since there are four output destination pixels to represent each input source pixel. The mapping is a step function having five output levels—0 through 4. FIG. 2c is a graph of the tone reproduction function of FIG. 2b and shows that there are four steps which occur at regular intervals, as the input value advances from 0 to 4. The straight diagonal line in the graph represents the ideal tone reproduction function (for reference purposes) as a direct linear mapping with no quantization.

Figures 2D, 2E, 2F:
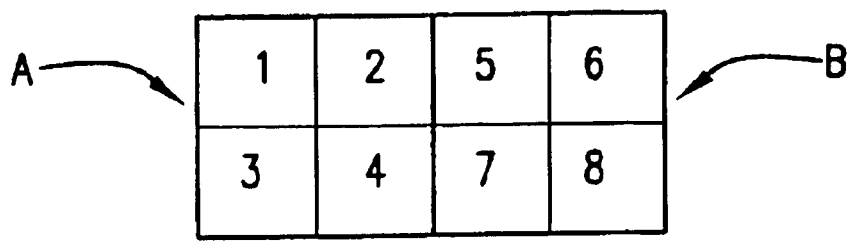
FIG. 2d shows a dither pattern in which two source pixels are filtered by different threshold indices.
FIG. 2e shows the tone reproduction for source pixel A resulting from use of the threshold indices of FIG. 2d.
FIG. 2f shows the tone reproduction for source pixel B resulting from use of the threshold indices of FIG. 2d.

FIG. 2d shows a dither pattern in which two source pixels are filtered by different threshold indices. Source pixel A contains indices 1 through 4 and source pixel B contains indices 5 through 8. Because the two source pixels are filtered with different threshold indices, they have different tone reproduction functions. These functions are represented by the tables in FIGS. 2e and 2f respectively. Since there are four output destination pixels to represent each input source pixel, the tone reproduction functions will again have five output levels. However, because the dither pattern is expanded to use a total of 8 different threshold indices, the input range for this pattern is mapped to 0.0 through 8.0.

Figure 2G:
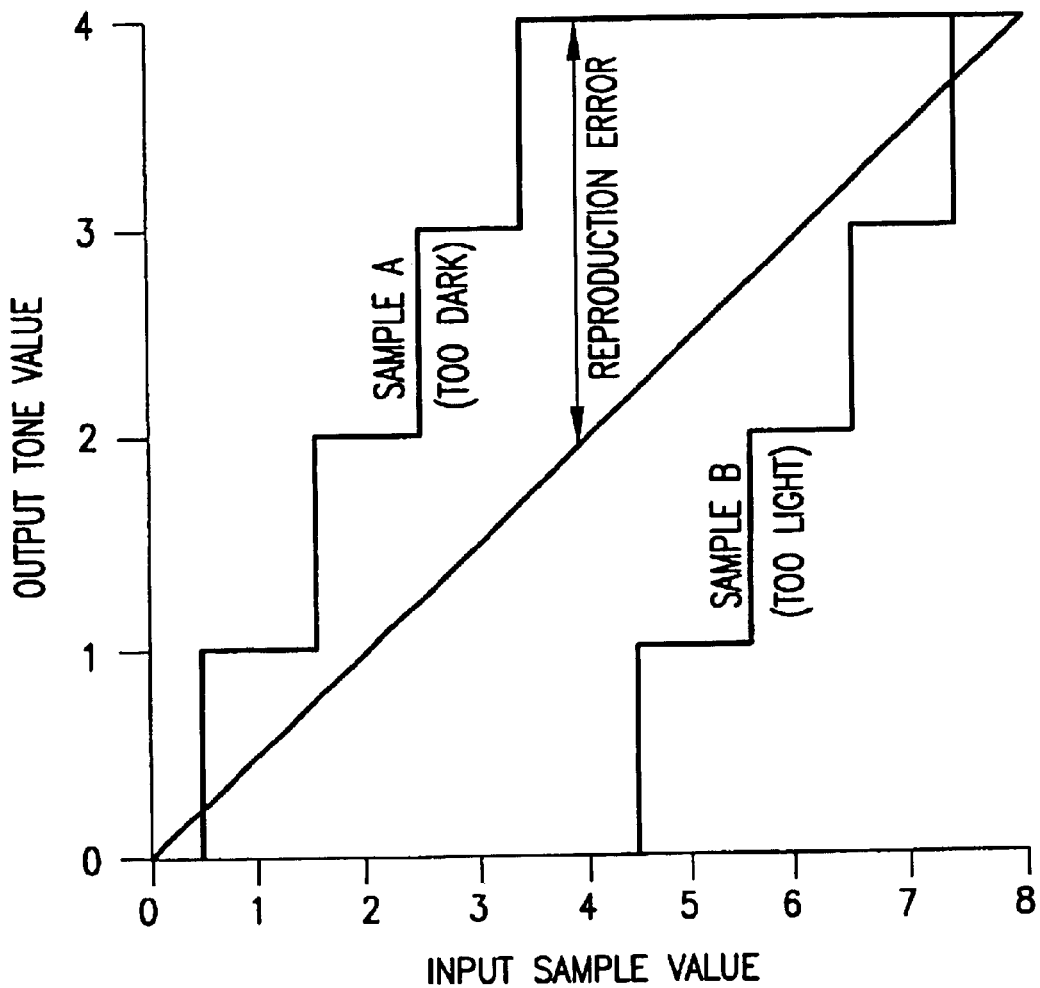
FIG. 2g is a graph of tone reproduction functions resulting from FIGS. 2e and 2f (the ideal tone reproduction function is included as a reference).

FIG. 2e shows that when the threshold indices are applied, via the halftoning algorithm, the tone reproduction for source pixel A increases at input source pixel values 0.5, 1.5, 2.5, and 3.5. FIG. 2f shows that the tone reproduction for source pixel B increases at input source pixel values 4.5, 5.5, 6.5, and 7.5. FIG. 2g is a graph of both tone reproduction functions (the ideal tone reproduction function is again included as a reference).

Analysis of this graph reveals a large disparity between the tone reproduction functions of the dither pattern and that of the ideal. Source pixel A is reproduced by a function which is substantially above the ideal (meaning that too much tone will be used) and source pixel B is reproduced by a function which is substantially below the ideal (meaning that too little tone will be used).

The Resampling Effect of Halftoning

Figures 3A, 3B:
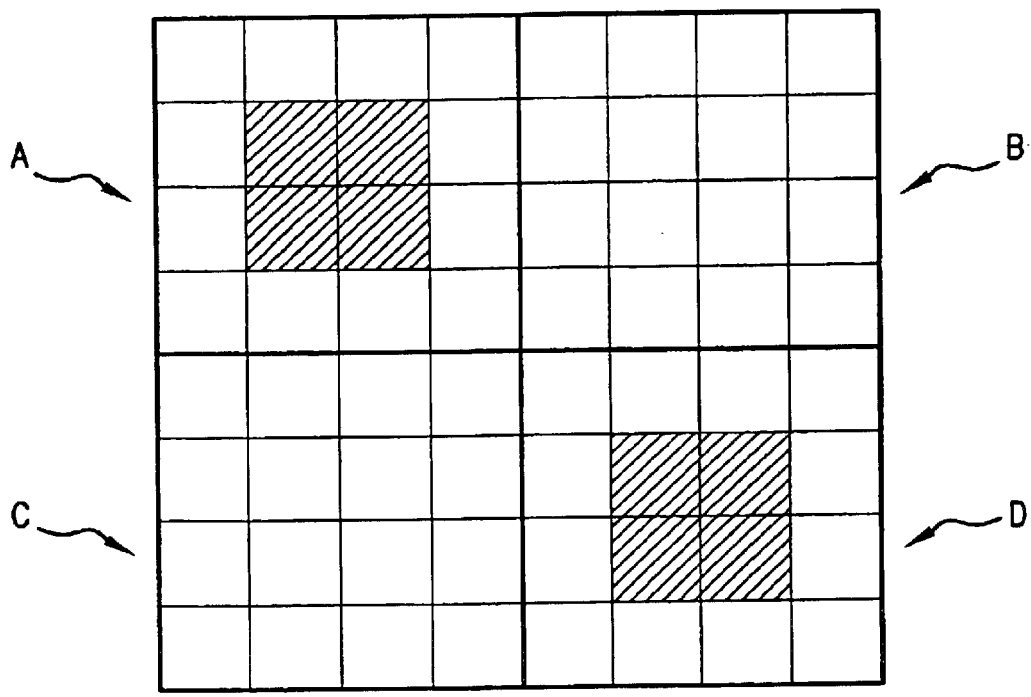
Figure 3C:
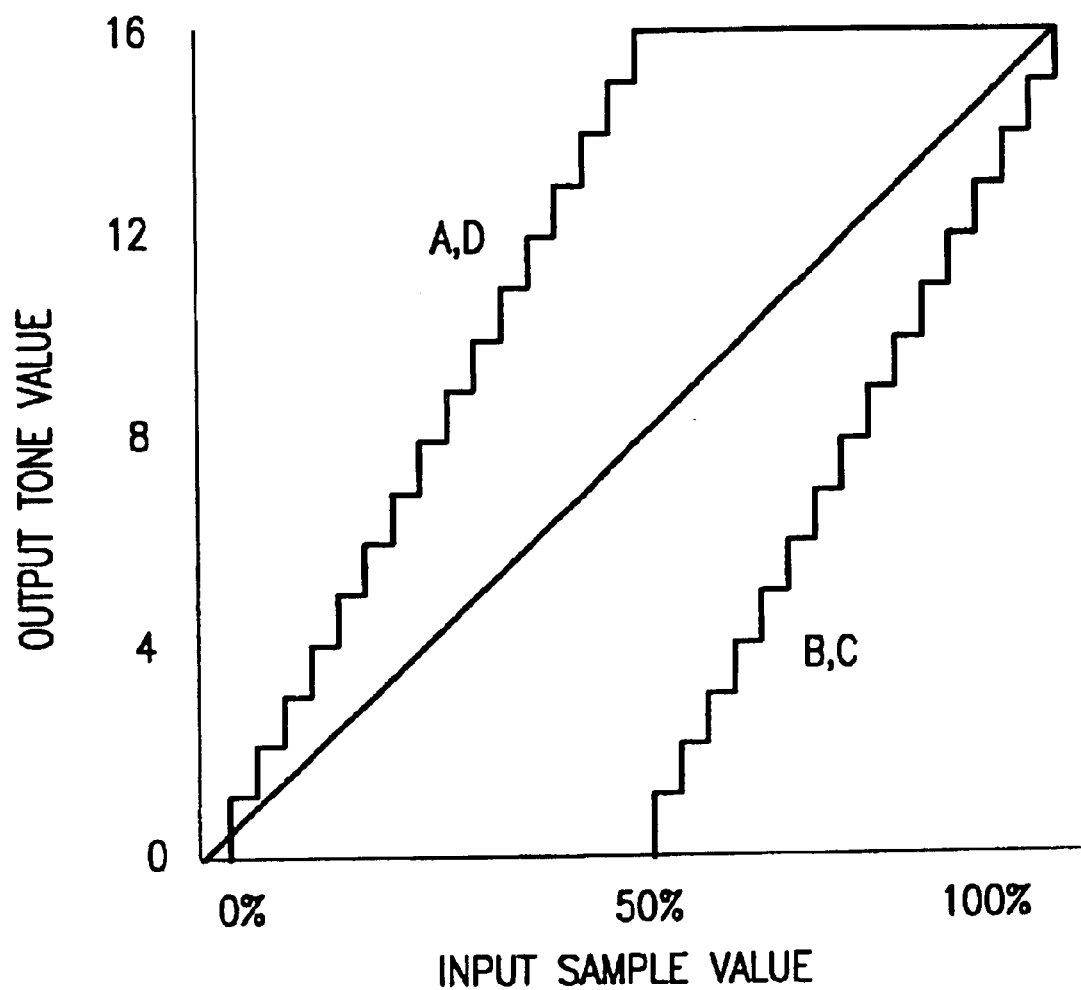

The problem which the invention addresses is demonstrated by the dither pattern represented in FIGS. 3a–3c. These Figures represent a typical example of a diagonal (45 degree) halftone screen (a widely used halftoning pattern). The dither pattern is designed in a conventional manner such that the dot cluster is initially developed over source pixels A and D and completes development over source pixels B and C. FIG. 3b graphically represents the development priority indicated numerically in FIG. 3a.

FIG. 3c demonstrates the problem associated with halftoning using this dither pattern. The tone reproduction graph for the pattern indicates two different functions with the potential for substantial reproduction error. Source pixels A and D, which are filtered by the initial development of the dot cluster (the black part of the dot), have a tone reproduction function which is above that of the ideal. Source pixels B and C, which are filtered by the final development of the dot cluster (the white part of the dot), have a tone reproduction function which is below that of the ideal.

These imperfect tone relationships are a normal and expected aspect of this known halftoning method. The method works, despite the imperfect source pixel reproduction, because the average tone output, taken over multiple source pixels, tends to be approximately correct. However, since it takes multiple source pixels to reproduce the correct average tone, the process of halftoning effectively resamples the data at a rate which is roughly equivalent to the size of a halftone cell. As previously described, this resampling causes aliasing and related artifacts which the present invention avoids.

To achieve acceptable image reproduction using the dither pattern of this example, it is required that most image content be relatively low-detail so that the effective sampling applied by the halftoning process remains adequate despite the fact that it is lower than the image's original sampling rate. Where this is not the case, aliasing artifacts will be produced.

Referring back to FIG. 2g, the reproduction error for any given input level can be determined by calculating the vertical distance between a tone reproduction function and the ideal. In this example, the greatest reproduction error occurs near the middle of the input range. The end-points of the functions, on the other hand, converge with the ideal— indicating that there is actually no reproduction error for those source pixel values. Nevertheless, it is clear that the dither pattern described in the example of FIG. 3 can result in significant misrepresentation of high detail and high frequency image content.

Halftoning Without Resampling (Direct 1 to 1 Screening)

Figures 4A, 4B:
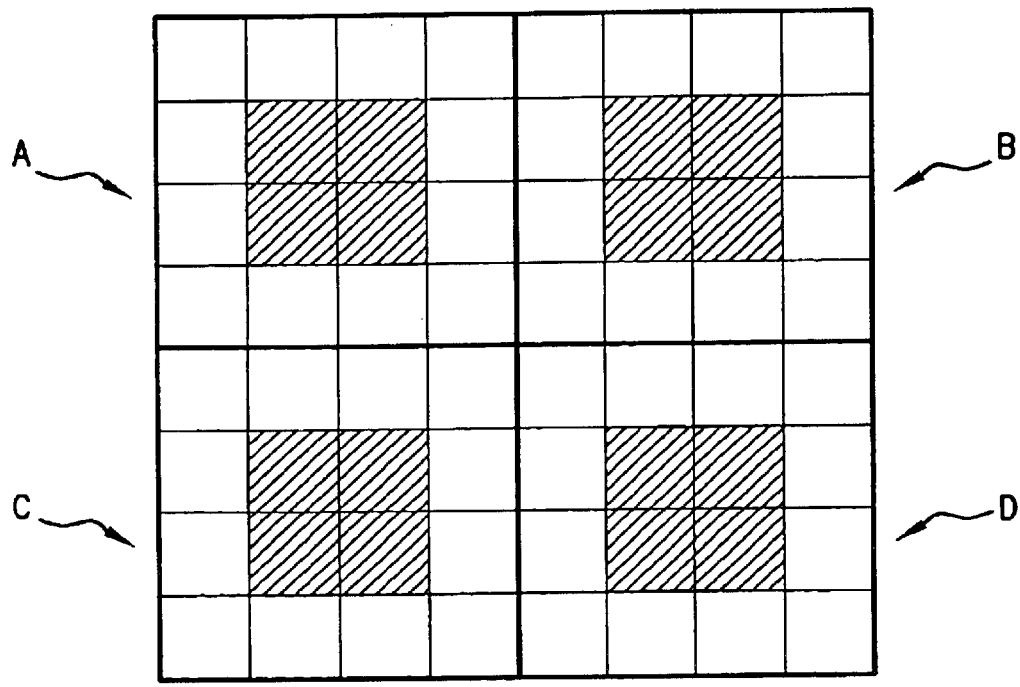
Figure 4C:
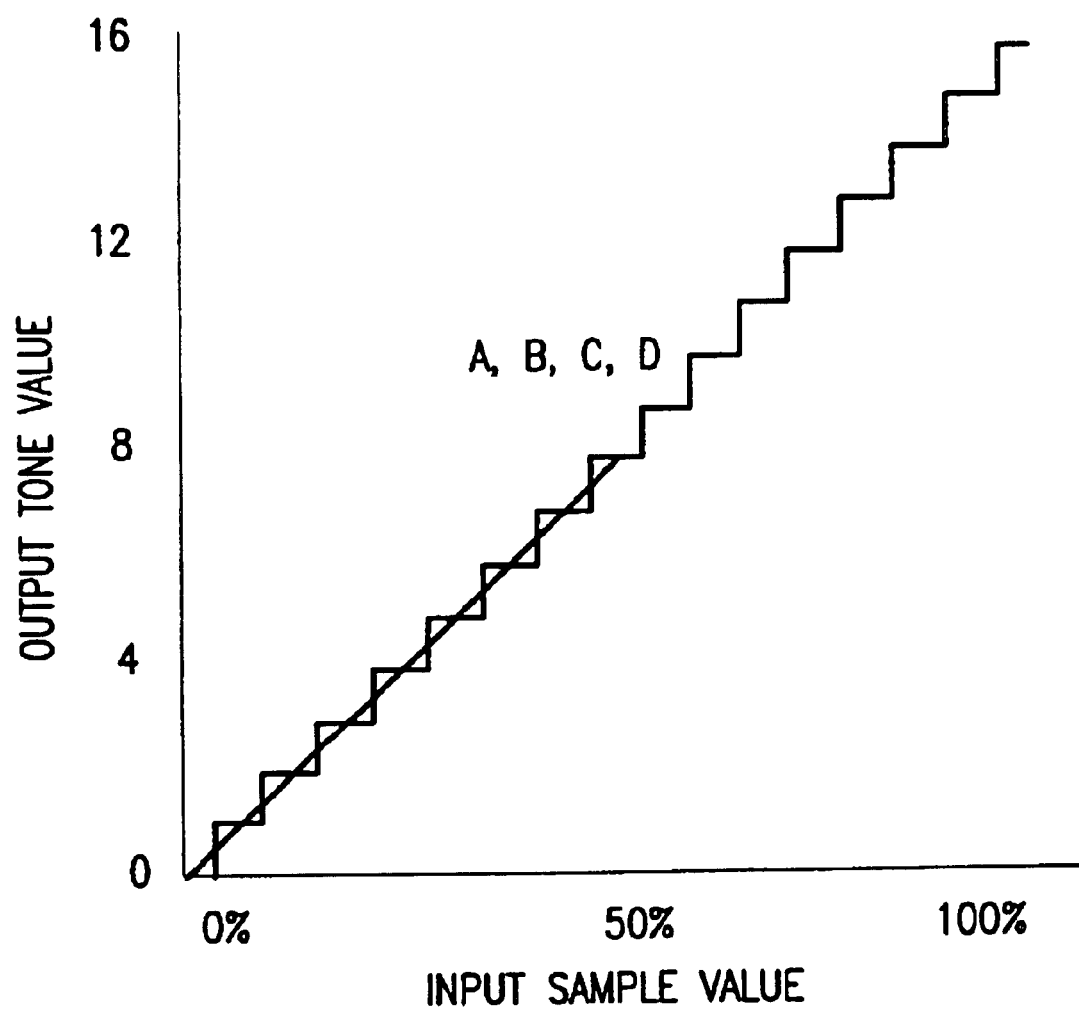

The present invention may best be understood by first understanding a simplified embodiment. It can be appreciated, that a direct 1 to 1 mapping of destination resolution halftone cells to source pixels can be performed without introducing a new sampling grid. FIGS. 4a–4c illustrate a dither pattern in which each source pixel is represented directly by an entire halftone cell.

FIG. 4c demonstrates that this direct halftone cell mapping solves the resampling problem described in respect of FIG. 3. Because each source pixel is represented directly by an entire halftone cell, the tone reproduction function represents a direct mapping, matching the ideal tone reproduction function except for quantization error—and it does not take multiple source pixels to reproduce the correct average tone. Therefore, the image is not resampled by the halftoning process. Since there is no resampling, the associated aliasing is also avoided.

Reduced Frequency 1 to 1 Screening

FIG. 4 embodies a simple form of 1 to 1 screening. Although direct 1 to 1 halftoning can be used to improve reproduction quality, it is often desirable to use a lower frequency halftone to address stability issues associated with a device's printing process. The present invention provides a means of halftoning with a reduced frequency dither pattern while still retaining the 1 to 1 tone reproduction property presented in FIG. 4.

Figures 5A, 5B:
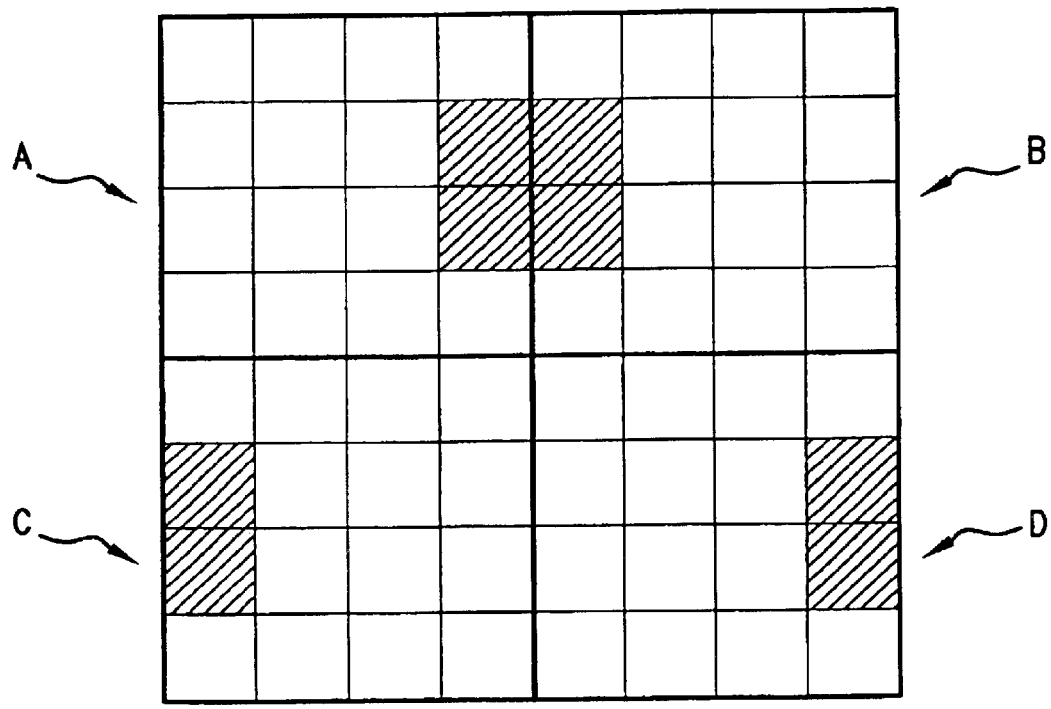

To see how this is accomplished, consider the following modification of the dither pattern presented in FIG. 4. FIGS. 5a & 5b demonstrate that the dither pattern can be rearranged to create a pattern which repeats with a lower frequency without altering the tone reproduction functions of the source pixels. In FIG. 5a the values of the threshold indices are not changed (with respect to the indices in FIG. 4) except that they are rearranged within the area of each source pixel. The resulting dither pattern has dot cluster growth which is centered at the boundaries between source pixels (a characteristic which is typical of the present invention).

Since the threshold indices representing each source pixel are not changed (only rearranged), the 1 to 1 mapping of tone is preserved and the tone reproduction functions remain equivalent to the ideal (again ignoring quantization error). Therefore, as in the case of the direct mapped dither pattern, (and despite the fact the halftone pattern has a reduced frequency) the input image is not resampled as a result of the halftoning process.

Figure 5C:
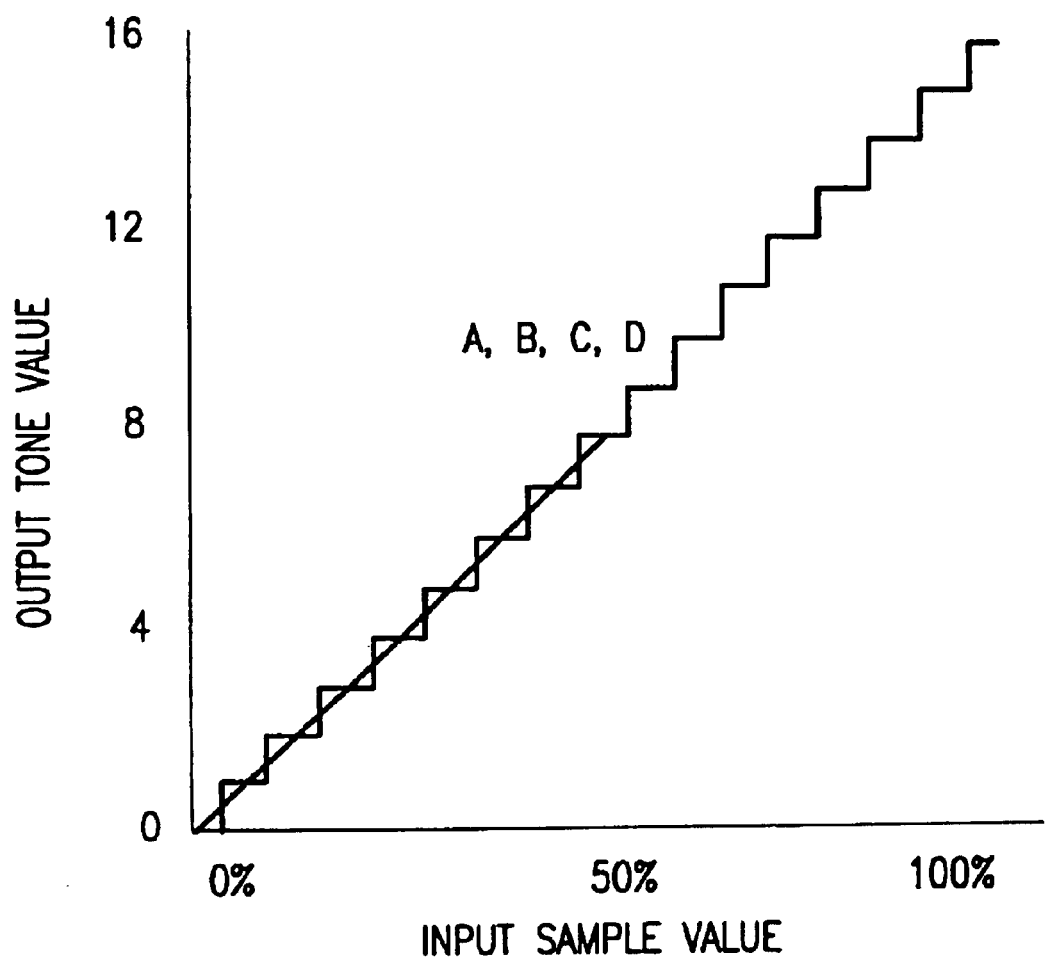

FIGS. 5a–5c embody the primary aspect of the present invention: halftoning such that the location of a source pixel does not have a large effect on the average tone of its reproduction, and further, varying the distribution of tone over the area of each source pixel, based on the location of that source pixel, to create a reduced frequency halftone pattern.

Dispersion of Quantization Error

In the discussion of FIG. 3, each source pixel is represented by a set of 16 threshold values which produce 16 binary output destination pixels. This configuration results in 17 output tone levels per source pixel. Since each source pixel uses the same set of threshold values, the entire image being halftoned is effectively quantized to 17 tone levels. Such quantization tends to create its own set of artifacts, most notably contouring, which is the appearance of visible tone steps in areas which should be represented as a smooth gradation.

A known method of reducing the appearance of contouring is to dither the output of the quantized values. This means the introduction of a slight variation in tone reproduction from source pixel to source pixel in order to create additional average tone levels when taken over a larger viewing area. When dithering is applied as a secondary modification to halftone patterns, the process is referred to as dispersion.

Figures 6A, 6B:
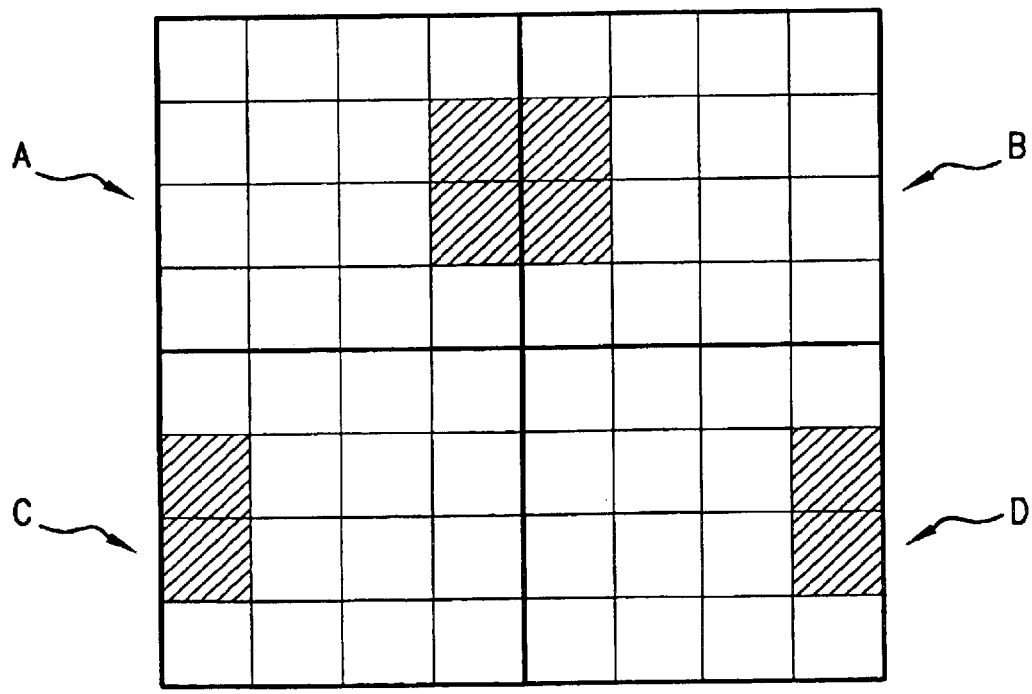

FIG. 6a demonstrates the application of a simple dispersion to the dither pattern of FIG. 5a. The pattern is modified by doubling the total number of threshold indices and alternating the advancement of index values between the source pixels so that source pixels A and D contain the odd values and source pixels B and C contain the even values. The result of this dispersion is an increase from 17 to 33 total tone levels for the dither pattern. As is apparent from a comparison of FIG. 6b to FIG. 5b, the primary halftone pattern remains substantially unchanged—maintaining the same diagonal pattern with dot growth centered at source pixel boundaries.

The 1 to 1 dither pattern in FIG. 6a is identical to the problematic dither pattern presented in FIG. 3a, except that it is rotated two positions to the right. This small difference accounts for the reproduction quality improvements that arise from use of the invention.

Figure 6C:
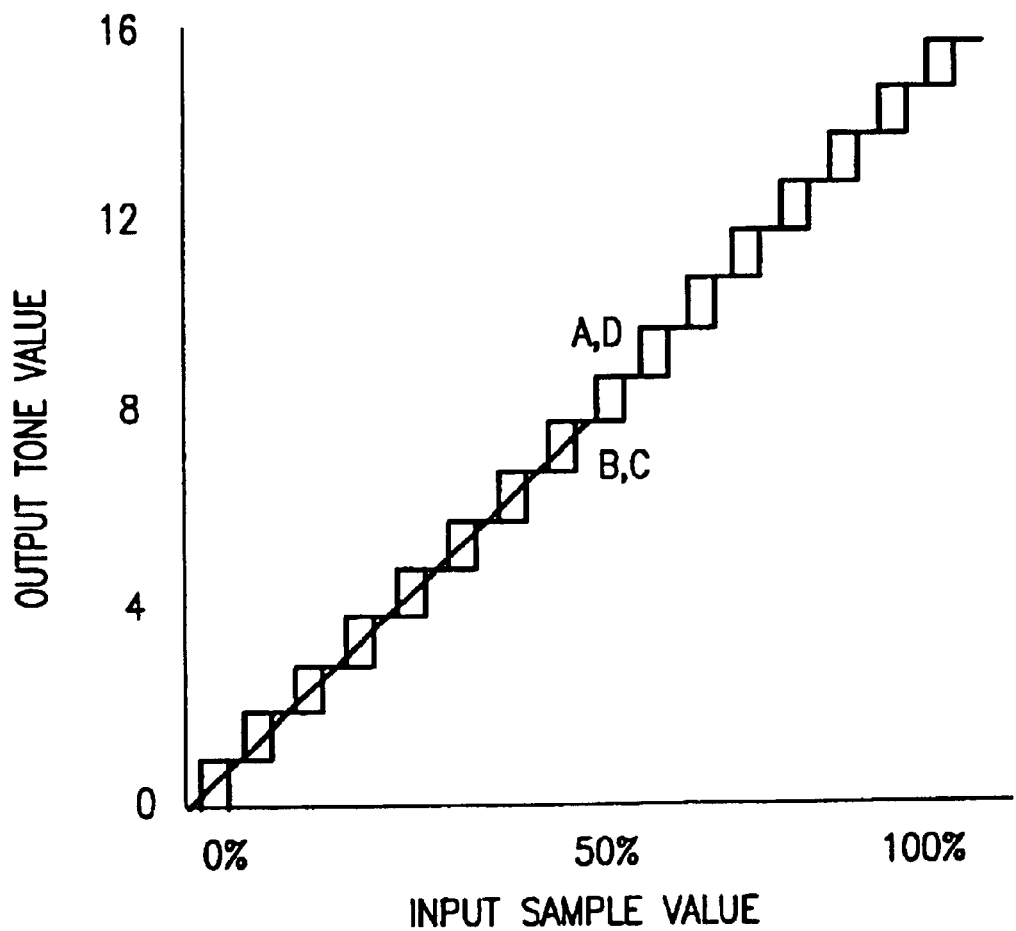

Dispersion can result in a slight location-based tone reproduction bias (represented graphically in FIG. 6c), however, given a reasonable number of available output tones per source pixel, this bias tends to be very small and therefore insignificant with respect to the creation of aliasing artifacts. As such, it is an aspect of this invention that source pixel reproduction may vary slightly from location to location as a result of dispersion.

Systematic Dither Pattern Generation

Here, the dither pattern is generated using a "spot function". The basis of this embodiment is that pixel priority is assigned based on the result of a mathematical function which takes as parameters values X and Y that represent coordinates relative to an origin, represented by a circle in FIGS. 7a–7c.

The process is as follows:
1) Compute spot function values for each pixel of the halftone matrix (FIG. 8a).
2) Determine ordered threshold indices for each pixel of the halftone matrix. This is accomplished by assigning the lowest indices to the smallest spot function values. Ties are broken by giving priority first to preceding rows, then to preceding columns (FIG. 8b).
3) To generate a 45 degree rotated screen, the threshold matrix is replicated and adjusted such that the pattern for source pixel D is equivalent to the pattern for source pixel A and the pattern for source pixel C is equivalent to the pattern for source pixel B (FIG. 8c).

Further Examples of 1 to 1 configurations

FIGS. 8a–8i schematically depict the construction of a variety of exemplary patterns which can be produced by application of the invention. The following table shows the basic relationships between sampling frequency and available 1 to 1 halftone frequencies.

| Sampling resolution | 45 degree screen frequency | Non-rotated screen frequency |
| --- | --- | --- |
| 600 dpi | 424 lpi | 300 lpi |
| 400 dpi | 283 lpi | 200 lpi |
| 300 dpi | 212 lpi | 150 lpi |
| 200 dpi | 141 lpi | 100 lpi |
| 150 dpi | 106 lpi | 75 lpi |

From the above description it can be seen that the halftoning action of the invention maintains specific relationships between a halftone pattern and the phase and resolution of the input image. Further, the halftone pattern is designed such that it does not bias tone reproduction with respect to the location of the input image source pixels, and each source pixel is given equal weight when filtered by the halftoning process. There is thus a 1 to 1 relationship between each source pixel of the input image and the corresponding tone output produced by the halftoning process. The application of the invention results in improved print quality, avoids certain types of moiré which are commonly associated with halftoning and provides improved reproduction of edges and image details.

It should be understood that the foregoing description is only illustrative of the invention. Various alternatives and modifications can be devised by those skilled in the art without departing from the invention. For example, the software procedures for accomplishing the invention may be incorporated into memory devices such as magnetic diskettes or CD ROMS, etc. and loaded into a processor on an as needed basis. Further, the invention may be implemented on a stand-alone computer or by a processor incorporated into a plinter, such as laser-driven electrostatic printer, inkjet printer, etc. Accordingly, the present invention is intended to embrace all such alternatives, modifications and variances which fall within the scope of the appended claims.

What is claimed is:

1. A method for creating a scaled halftoned destination pixel image from a source pixel image portion that comprises plural source pixels, said method comprising the steps of:
    a) creating a scaled set of matrix values;
    b) depending upon a determined halftone relationship of source pixel and each of said scaled set of matrix values, creating a scaled set of destination pixels, each respective destination pixel value dependent upon a relationship of a value of said source pixel and a corresponding matrix value; and
    c) repeating step b) for each source pixel, using said scaled set of matrix values, and arranging said scaled set of matrix values to create a determined halftone pattern over said source pixels that exhibits a desired repeating pattern with a repetition frequency that is less than a repetition frequency of said source pixels, each said scaled set of destination pixels produced thereby exhibiting a reduced tonal error as a result of use of said scaled set of matrix values for each said source pixel.

2. The method as recited in claim 1, wherein said scaled set of matrix values encompasses plural source pixels, and said scaled set of matrix values is arranged so as to allocate sets of destination matrix values among adjoining source pixels to create a destination pixel arrangement that exhibits a dispersion of error values.

3. The method as recited in claim 1, wherein said rearranging of said scaled set of matrix values is performed in accord with the following steps:
    assigning an origin position to each said source pixel in accord with a desired halftone pattern; and
    arranging said scaled set of matrix values about said origin position so as to create a consistent and repeating pattern of said set of destination pixels about said origin position.

4. The method as recited in claim 3, wherein said rearranging for each set of destination pixels is performed by assigning destination pixel values in accord with destination pixel priority values, each priority value determined by a distance relationship to a respective origin position.

5. A memory media for controlling a processor to create a scaled halftoned destination pixel image from a source pixel image portion that comprises plural source pixels, said memory media comprising:
    a) means for controlling said processor to create a scaled set of matrix values;
    b) means for controlling said processor to create a scaled set of destination pixels, depending upon a determined halftone relationship of source pixel and each of said scaled set of matrix values, each respective destination pixel value dependent upon a relationship of a value of said source pixel and a corresponding matrix value; and
    c) means for controlling said processor to cause means b) to repeat its respective operation for each source pixel, using said scaled set of matrix values, and for each source pixel, to arrange said scaled set of matrix values to create a determined halftone pattern over said source pixels that exhibits a desired repeating pattern with a repetition frequency that is less than a repetition frequency of said source pixels, each said scaled set of destination pixels produced thereby exhibiting a reduced tonal error as a result of use of said scaled set of matrix values for each said source pixel.

6. The memory media as recited in claim 5, wherein said scaled set of matrix values encompasses plural source pixels, and said scaled set of matrix values is arranged so as to allocate sets of destination matrix values among adjoining source pixels to create a destination pixel arrangement that exhibits a dispersion of error values.

7. The memory media as recited in claim 5, wherein means c) controls said processor to rearrange said scaled set of matrix values in accord with the following steps:
    assigning an origin position to each said source pixel in accord with a desired halftone pattern; and
    arranging said scaled set of matrix values about said origin position so as to create a consistent and repeating pattern of said set of destination pixels about said origin position.

8. The memory media as recited in claim 7, wherein said rearranging for each set of destination pixels is performed by assigning destination pixel values in accord with destination pixel priority values, each priority value determined by a distance relationship to a respective origin position.

* * * * *